US007788682B2

(12) United States Patent
Okazaki et al.

(10) Patent No.: US 7,788,682 B2
(45) Date of Patent: Aug. 31, 2010

(54) DISK DEVICE WITH CAM MECHANISM FOR MOVING SLIDER

(75) Inventors: Nobuyuki Okazaki, Daito (JP); Ryuuji Hayashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 923 days.

(21) Appl. No.: 11/563,745

(22) Filed: Nov. 28, 2006

(65) Prior Publication Data

US 2007/0124747 A1   May 31, 2007

(30) Foreign Application Priority Data

Nov. 29, 2005   (JP)   ............................. 2005-343711

(51) Int. Cl.
*G11B 17/03*   (2006.01)
*G11B 17/04*   (2006.01)
*G11B 33/02*   (2006.01)
*G11B 7/00*   (2006.01)

(52) U.S. Cl. .................. 720/604; 720/607; 720/664

(58) Field of Classification Search .............. 720/604, 720/605, 607, 663, 664
See application file for complete search history.

(56) References Cited

U.S. PATENT DOCUMENTS

| 6,741,536 | B1 * | 5/2004 | Ariyoshi et al. | 720/635 |
| 7,610,590 | B2 * | 10/2009 | Nasu et al. | 720/608 |
| 2004/0154029 | A1 * | 8/2004 | Nishidate | 720/605 |

FOREIGN PATENT DOCUMENTS

| JP | 2003-141849 | 5/2003 |
| JP | 2004-241124 | 8/2004 |
| JP | 2004-288333 | 10/2004 |

* cited by examiner

*Primary Examiner*—Craig A. Renner
*Assistant Examiner*—Gustavo Polo
(74) *Attorney, Agent, or Firm*—Global IP Counselors, LLP

(57) ABSTRACT

A disk device of the present invention includes a first cam mechanism, a disk transfer mechanism, a second cam mechanism, a slider positioning mechanism and a positioning release mechanism. The slider positioning mechanism prevents movement of a slider in a reverse direction by engaging the slider when the slider is at a forward limit position. The positioning release mechanism operates the slider positioning mechanism so as to release an engagement of the slider positioning mechanism with the slider in conjunction with a return of an optical pickup.

15 Claims, 13 Drawing Sheets

DISK DEVICE WITH CAM MECHANISM FOR MOVING SLIDER

CROSS-REFERENCE TO RELATED APPLICATIONS

This application claims priority to Japanese Patent Application No. 2005-343711. The entire disclosure of Japanese Patent Application No. 2005-343711 is hereby incorporated herein by reference.

BACKGROUND OF THE INVENTION

1. Field of the Invention

The present invention generally relates to a disk device. More specifically, the present invention relates to a disk device in which a single motor is shared by a drive source for moving an optical pickup and a drive source for a slider.

2. Background Information

A disk device in which a single motor is shared by a drive source for moving an optical pickup and a drive source for a slider has been proposed. The drive source for moving an optical pickup moves an optical pickup at its operation mode position. The drive source for a slider moves a slider used to unclamp a disk that has been clamped by a clamping mechanism prior to the ejection of the disk.

To suppress unnecessary sliding displacement of the slider with this type of disk device, it has been proposed that a protruding part of a leaf spring formed integrally with the slider be made to exert pressure on a stopper rib on a fixed side (see, for example, Japanese Laid-Open Patent Application 2004-288333). It is stated in Japanese Laid-Open Patent Application 2004-288333 that a single motor is shared by the movement drive source of an optical pickup and the drive sources of a slider. When the optical pickup is scanning a disk at an operating mode position, a rack of the slider is located across and at a distance away from a pinion that is driven by the motor so that the rotation of the pinion is not transferred to the slider.

There have also been proposals for improving the ease of mounting a disk in a disk tray of a disk device (see, for example, Japanese Laid-Open Patent Application 2004-241124), and proposals for carrying out the raising and lowering of mechanism units in conjunction with the operation of a slider more smoothly (see, for example, Japanese Laid-Open Patent Application 2003-141849).

FIG. 12 is an external oblique view of a disk device. FIG. 13 is a plan view of the simplified configuration of the main components of the disk device.

With the disk device shown in FIG. 12, a disk tray 2 is movably attached to a plastic chassis 1 made in the form of a frame. The insertion and removal of a disk (not shown) into and from the disk device are accomplished by opening or closing the disk tray 2.

As shown in FIG. 13, the chassis 1 is equipped with an elevating frame (mechanism chassis) 5 to which an optical pickup 3 or a turntable (rotating table) 4 are attached. This elevating frame 5 has at one end a support point 5a (indicated by a one-dot chain line), and has at the other end a boss 5b that is engaged with a cam groove (not shown) of a slider (cam slider) 6. When the slider 6 slides to the left or right as indicated by the arrow X, the boss 5b is raised or lowered by the action of the cam groove. This raising or lowering of the boss 5b raises or lowers the elevating frame 5 around the support point 5a. When the elevating frame 5 is raised, a disk that has been brought in by the disk tray 2 is accepted by the turntable 4 and lifted out of the disk tray 2 so that the disk is clamped between the turntable 4 and a damper 7, shown in FIG. 12. Conversely, when the elevating frame 5 is lowered, the disk is unclamped, the disk is transferred from the turntable 4 to the disk tray 2. The disk is then ready for ejection by the disk tray 2.

The movement of the optical pickup 3 at the operating mode position is accomplished by transmitting the rotation of a pinion 8a to a rack 3a of the optical pickup 3. The sliding of the slider 6 in the left and right direction $X_2$ and $X_1$ is accomplished by transmitting the rotation of another pinion 8b to a rack 6a of the slider 6. In this case, the operating mode of the optical pickup 3 is performed when the disk has been clamped between and rotated with the damper 7 and the turntable 4, and a single motor is used as the drive source for the two pinions 8a and 8b. Therefore, if no clutch or other path switching mechanism is interposed along the transmission path from the motor to the pinions 8a and 8b, some structures are employed for keeping the rotation of the other pinion 8b from being transmitted to the rack 6a of the slider 6 during the operating mode of the optical pickup 3.

With the disk device in FIG. 13, this is accomplished, by setting the shape of the cam groove (not shown) of the slider 6 Such that the elevating frame 5 will be raised and the clamped state of the disk will be maintained when the slider 6 has reached a forward limit position. The forward limit position is a position of the slider 6 where the meshing of the rack 6a and the pinion 8b will be released and the rack 6a will be kept across and at a distance away from the pinion 8b.

Meanwhile, with the disk device in FIG. 13, the drive source for opening and closing the disk tray 2 shares the motor used as the drive source for the optical pickup 3 and the slider 6. A tray gear 8c, which is provided integrally with the pinion 8b that is configured to mesh with the rack 6a of the slider 6, is made to correspond to a rack 2a disposed at a back of the disk tray 2. As a result, the rack 2a is kept across and at a distance away from the tray gear 8c so that the rotation of the tray gear 8c will not be transmitted to the rack 2a of the disk tray 2 during the operating mode of the optical pickup 3. When a disk is brought in by the disk tray 2, the slider 6 is moved in the direction of the arrow X2 prior to the ejection of the disk tray 2. This movement of the slider 6 guides a protrusion 6b of the slider 6 to a sloped cam groove 2b provided on the back of the disk tray 2, and ejects the disk tray 2 slightly, which allows the rack 2a to mesh with the tray gear 8c.

With the disk device described through reference to FIG. 13, in the operating mode of the optical pickup 3 when the elevating frame 5 is raised and the disk is clamped, the engagement between the cam groove of the slider 6 and the boss 5b on the elevating frame 5 side has the effect of preventing movement of the slider 6 in the X2 direction. On the other hand, there is inevitably a certain amount of play between the boss 5b and the cam groove (not shown), so the slider 6 may move in the direction of the arrow X2 due to vibration or the like. If this vibration happens, there is a risk that the rack 6a of the slider 6 will mesh with the freewheeling pinion 8b so that the rotation of the pinion 8b is transmitted to the slider 6, which results in the unintentional opening or closing of the disk tray 2.

The technology proposed in Japanese Laid-Open Patent Application 2004-288333 can be employed as a way of improving this situation. Nevertheless, the proposal in Japanese Laid-Open Patent Application 2004-288333 is a protruding part of a leaf spring formed integrally with the slider to exert pressure on a stopper rib on the fixed side. Therefore, there is a risk that the protruding part may slide over the stopper rib and cause the unintended movement of the slider.

Also, not only is it difficult to manage the dimensions of the leaf spring, but deterioration (flattening) of the leaf spring tends to compromise the operational stability of the spring. The same applies when the leaf spring is made as a separate part from stainless steel or another such metallic material.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above situation. It is an object of the present invention to provide a disk device with which the slider that is used to maintain the clamped state of a disk during the operating mode of an optical pickup can be effectively prevented from moving unintentionally during the operating mode of the optical pickup and commencing the ejection of the disk tray.

It is another object of the present invention to provide a disk device with which, when the unintentional movement of the slider is prevented by engaging a stopper in the form of a tab with a receiver on the slider, the operation of the stopper will be controlled by the forward and the reverse movement of the slider, which facilitates management of dimensions when the stopper is added.

It is a further object of the present invention to provide a disk device which can be applied advantageously and by which the objects stated above can be achieved when a single motor is shared by a drive source for moving an optical pickup at its operating mode position, a drive source for the forward and the reverse movement of a slider, and a drive source for opening and closing a disk tray.

The disk device of the first aspect of the present invention includes a first cam mechanism, a disk transfer mechanism, a second cam mechanism, a slider positioning mechanism and a positioning release mechanism. The first cam mechanism is configured arranged to move a slider in a reverse direction from a forward limit position in conjunction with a return of an optical pickup from an operating mode position toward a home position, and further configured and arranged to link the slider to a feed mechanism for feeding the slider toward a reverse limit position. The disk transfer mechanism is configured and arranged to unclamp a disk clamped by a clamping mechanism in conjunction with the feeding of the slider to the reverse limit position by the feed mechanism, and further configured and arranged to transfer the disk to a disk tray. The second cam mechanism is configured and arranged to link the disk tray to a disk tray ejecting mechanism. The slider positioning mechanism is configured to prevent a movement of the slider in the reverse direction by engaging the slider when the slider is at the forward limit position. The positioning release mechanism is configured to operate the slider positioning mechanism so as to release an engagement of the slider positioning mechanism with the slider in conjunction with the optical pickup returning to the home position.

With this constitution, the slider positioning mechanism engages the slider when the slider is at the forward limit position. this effectively prevents the unintentional movement of the slider. Accordingly, the slider at the forward limit position is not subject to feed force from the feed mechanism. Also, the engagement of the slider positioning mechanism with the slider is released in conjunction with the return of the optical pickup from the operating mode position toward the home position, so the retraction (or ejection) of the disk tray is smoother after the release.

In the disk device of the second aspect of the present invention, the slider positioning mechanism includes a stopper in the form of a tab that prevents movement of the slider by engaging the slider.

In the disk device of the third aspect of the present invention, the stopper is rotatably attached to a fixed chassis so as to rotate between an engaged position, in which the stopper engages the slider, and a retracted position in which the stopper is disposed below the movement path of the slider.

In the disk device of the fourth aspect of the present invention, the stopper is always elastically biased toward the engaged position.

In the disk device of the fifth aspect of the present invention, the positioning release mechanism includes a pushing tab of the optical pickup and a receiving tab integrally provided to the stopper, and the pushing tab pushes the receiving piece so as to release the stopper from the engaged position.

With this constitution, the stopper that is always elastically biased toward the engaged position is constituted so as to be capable of rotational displacement between an engaged position with respect to the receiver of the slider and a retracted position below the movement path of the slider. Therefore, up until the forward moving slider reaches the forward limit position, the stopper is in a state of sliding while held to the lower face of the slider. When the slider reaches the forward limit position, the stopper comes away from the lower face of the slider and at the same time is displaced to the engaged position, where the stopper engages with the receiver of the slider. Accordingly, it is easy to manage the dimensions in adding the stopper. In other words, the timing at which the stopper is displaced from the retracted position to the engaged position is easily and exactly determined. Also, since the positioning release mechanism is made up of a pushing tab on the optical pickup side and a receiving piece on the stopper side, the pushing tab and receiving piece are constituted integrally with the stopper, so the increase in the number of parts is kept to a minimum.

In the disk device of the sixth aspect of the present invention, the feed mechanism includes a pinion that is rotationally driven by a drive motor for moving the optical pickup at the operating mode position, and a slider rack that is disposed on the slider and is located across and a distance away from the pinion when the slider is at the forward limit position. The pinion is freewheeled by the drive motor during the movement of the optical pickup at the operating mode position.

Again with this constitution, the pinion of the feed mechanism is freewheeled by the drive motor during the movement of the optical pickup at the operating mode position, and unintended movement of the slider is effectively prevented at the forward limit position by the stopper of the positioning mechanism. Thus, there is no unintended reverse movement of the slider caused by unintended movement of the slider, and no unintended retraction or the like of the disk tray in conjunction with the reverse movement of the slider. Furthermore, it is possible to use a single motor as the drive source for the optical pickup and the drive source for the slider, and also as the drive source for the disk tray.

In the disk device of the seventh aspect of the present invention, the first cam mechanism includes a slider cam groove of the slider, and a protrusion of the optical pickup, and the protrusion engages with the slider cam groove in conjunction with the return of the optical pickup.

In the disk device of the eighth aspect of the present invention, the stopper is attached to a cylindrical component rotatably attached to a fixed chassis, and the receiving tab is attached to the cylindrical component.

With the present invention, the slider used to maintain the clamped state of a disk during the operating mode of an optical pickup can be effectively prevented from moving unintentionally during the operating mode of the optical pickup and commencing the ejection of the disk tray.

In particular, since the unintended movement of the slider is prevented by engaging a stopper in the form of a table with a receiver of the slider, and the operation of the stopper will be controlled by the forward and the reverse movement of the slider, the management of dimensions when the stopper is added is facilitated. The present invention is favorably applied to a case in which the drive source for the forward and the reverse movement of a slider and the drive source for opening and closing a disk tray share a single motor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
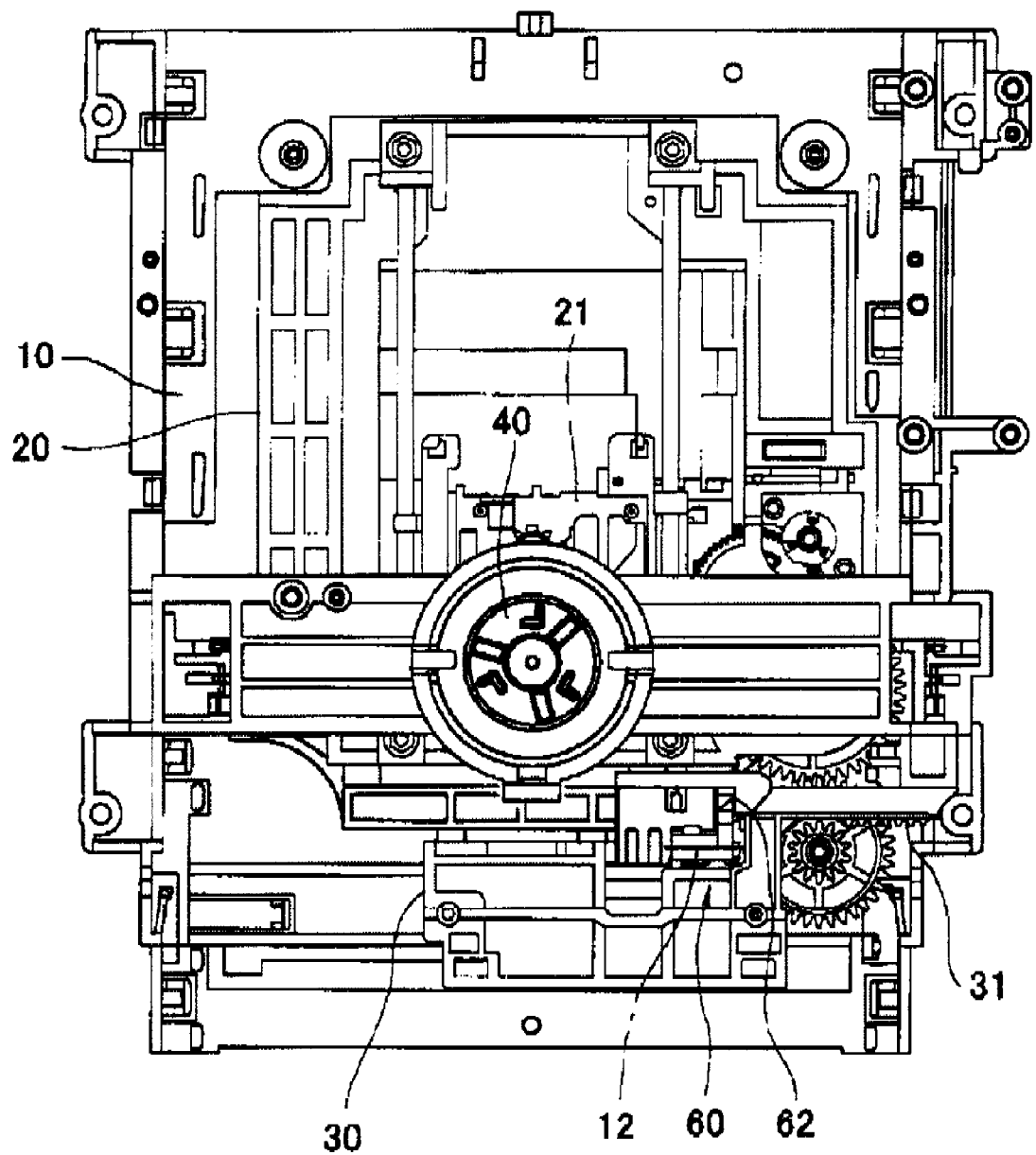
FIG. 1 is a plan view of the main portion of the disk device pertaining to an embodiment of the present invention.
Figure 2:
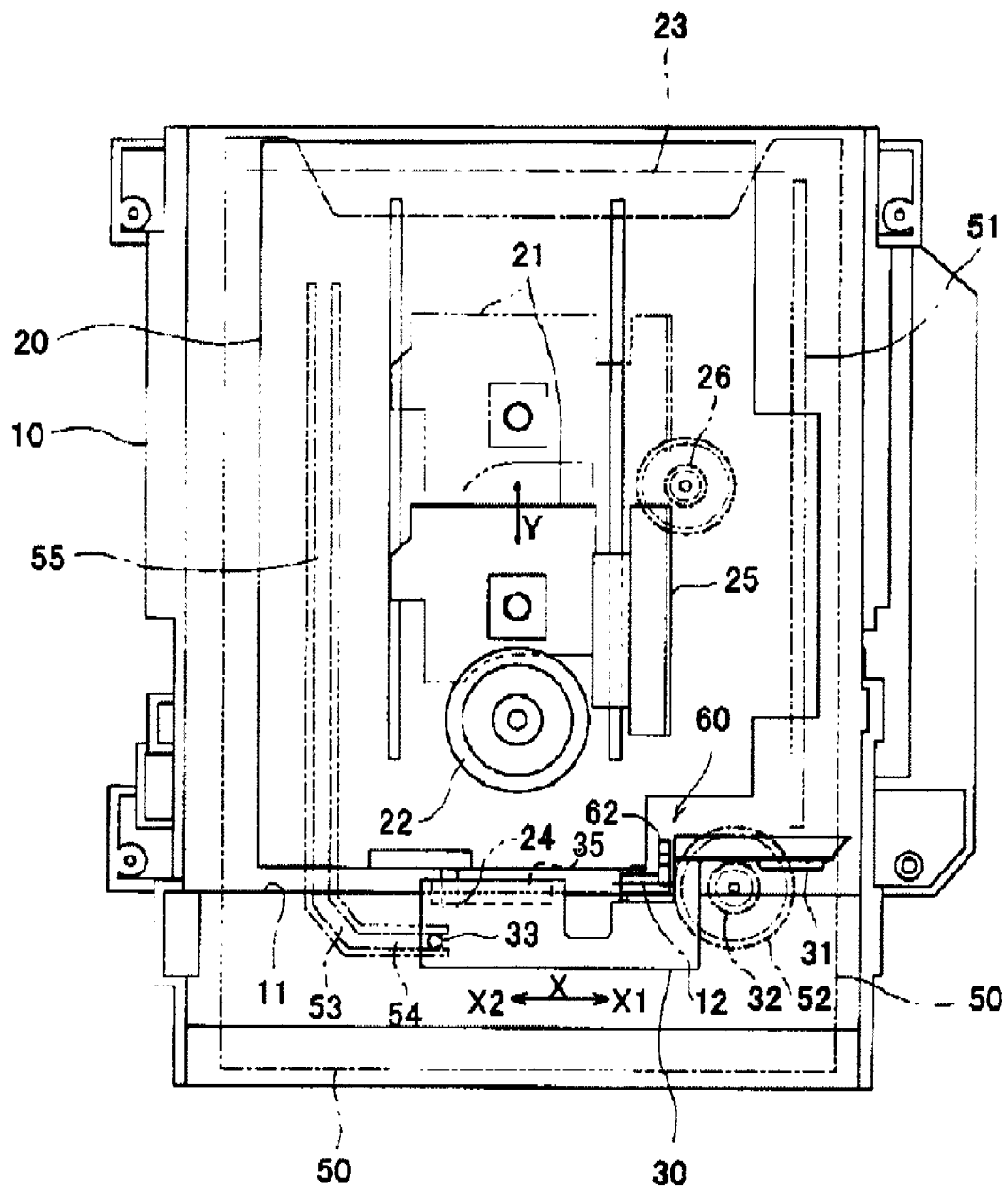
FIG. 2 is a plan view of the simplified configuration of the main components of a disk device in a state when a slider has reached a forward limit position.
Figure 3:
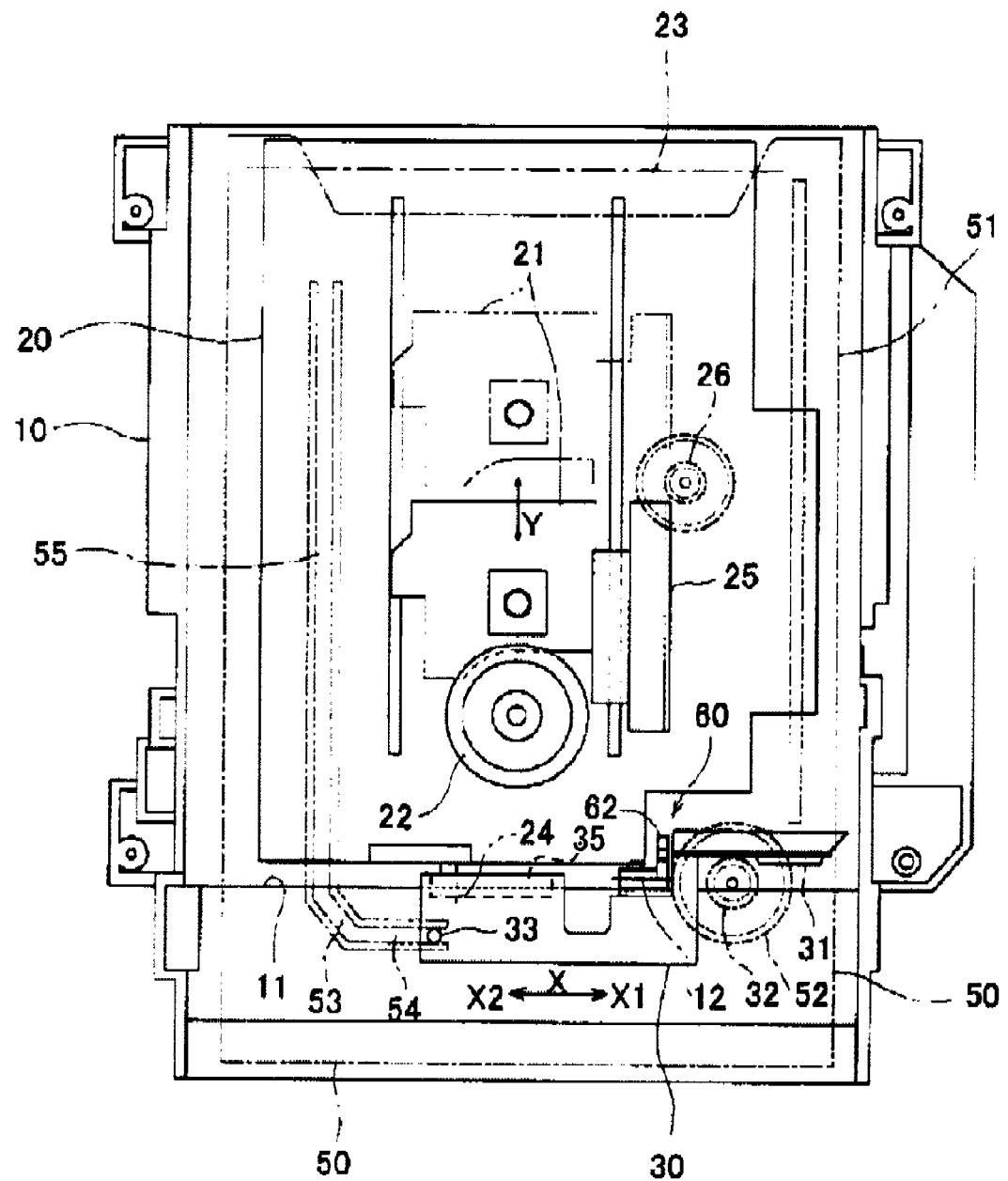
FIG. 3 is a plan view of the simplified configuration of the main components of a disk device in a state when the slider has reached a reverse limit position.

In FIG. 1, a disk device according to an embodiment of the present invention includes a plastic chassis 10, an elevating frame 20, a slider 30, a damper 40, and a disk tray 50. The chassis 10 serves as a frame formed in a rectangular shape. The elevating frame 20, the slider 30 and the damper 40 are assembled on the chassis 10. In FIGS. 2 and 3, the disk tray 50 and a disk D (see FIG. 11) are inserted into and removed from the disk device by opening and closing the disk tray 50.

An optical pickup 21 and a turntable 22 are attached to the elevating frame 20. The elevating frame 20 has a support point 23 (indicated by a one-dot chain line) at one end, and has a boss 24 engaged in a cam groove 35 of the slider (cam slider) 30 at another end. When the slider 30 slides to the left or right as indicated by the arrow X, the action of the cam groove 35 raises or lowers the boss 24. This raising or lowering of the boss 24 causes the elevating frame 20 to go up and down around the support point 23.

An optical pickup pinion 26 is attached to the elevating frame 20. The optical pickup pinion 26 is rotationally driven forward and backward by a motor (not shown) that serves as a drive source for the elevating frame 20. The optical pickup pinion 26 is meshed with an optical pickup rack 25 of the optical pickup 21. In an operating mode of the optical pickup 21, a rotation of the optical pickup pinion 26 is converted by the optical pickup rack 25 into linear motion. The optical pickup 21 moves in and out in the radial direction Y of the disk D (see FIG. 11). When the optical pickup 21 is switched from the operating mode to a non-operating mode, the optical pickup 21 performs a return operation from an operating mode position, and returns to a home position, which is indicated by solid lines in FIGS. 2 and 3.

The slider 30 is installed so as to be capable of forward and reverse movement to the right and left. The slider 30 is disposed on a slider seat 11 of the chassis 10. The slider 30 has a slider rack 31 that is configured to mesh with a slider pinion 32 disposed on the chassis 10. Specifically, when the slider 30 has reached its forward limit position, as shown in FIG. 2, and when the slider 30 has reached its reverse limit position, as shown in FIG. 3, the slider rack 31 is across and at a distance away from the slider pinion 32. On the other hand, when the elevating frame 20 is to be raised or lowered, the slider rack 31 meshes with the slider pinion 32, and the elevating frame 20 moves forward (arrow X1) or in reverse (arrow X2) through the forward or reverse rotation of the slider pinion 32.

The optical pickup pinion 26 that is used to drive the optical pickup 21, and the slider pinion 32 that is used to move the slider 30 forward and in reverse are constituted such that they are always linked by a gear train (not shown). Furthermore, the optical pickup and slider pinions 26 and 32 are rotationally driven by a single motor provided to the elevating frame 20.

The disk tray 50, which is indicated by the one-dot chain line in FIGS. 2 and 3, is equipped with a long disk tray rack 51 that extends in a longitudinal direction on a back side. The disk tray rack 51 is able to mesh with a plastic tray gear 52. The plastic tray gear 52 is integrally and concentrically formed with the slider pinion 32 for moving the slider 30 forward and in reverse. The disk tray 50 has a sloped cam groove 53 and first and second guide grooves 54 and 55 that are linked to the sloped cam groove 53. The sloped cam groove 53 and first and second guide grooves 54 and 55 are disposed on a back of the disk tray 50. A protrusion 33 of the slider 30 is disposed in the sloped cam groove 53 and first and second guide grooves 54 and 55.

Figure 4:
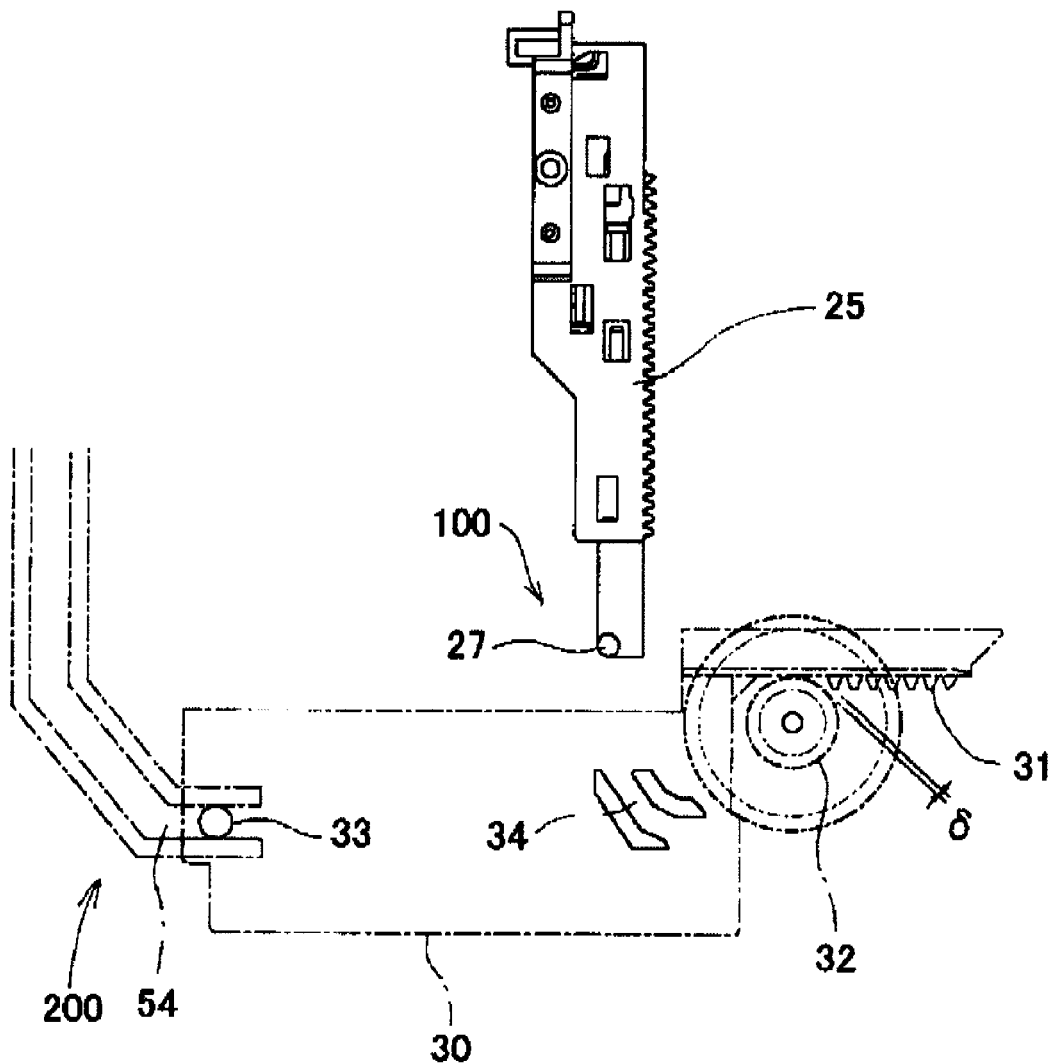
FIG. 4 is a diagram illustrating the positional relationship between a rack on an optical pickup side and the slider in the forward limit position.
Figure 5:
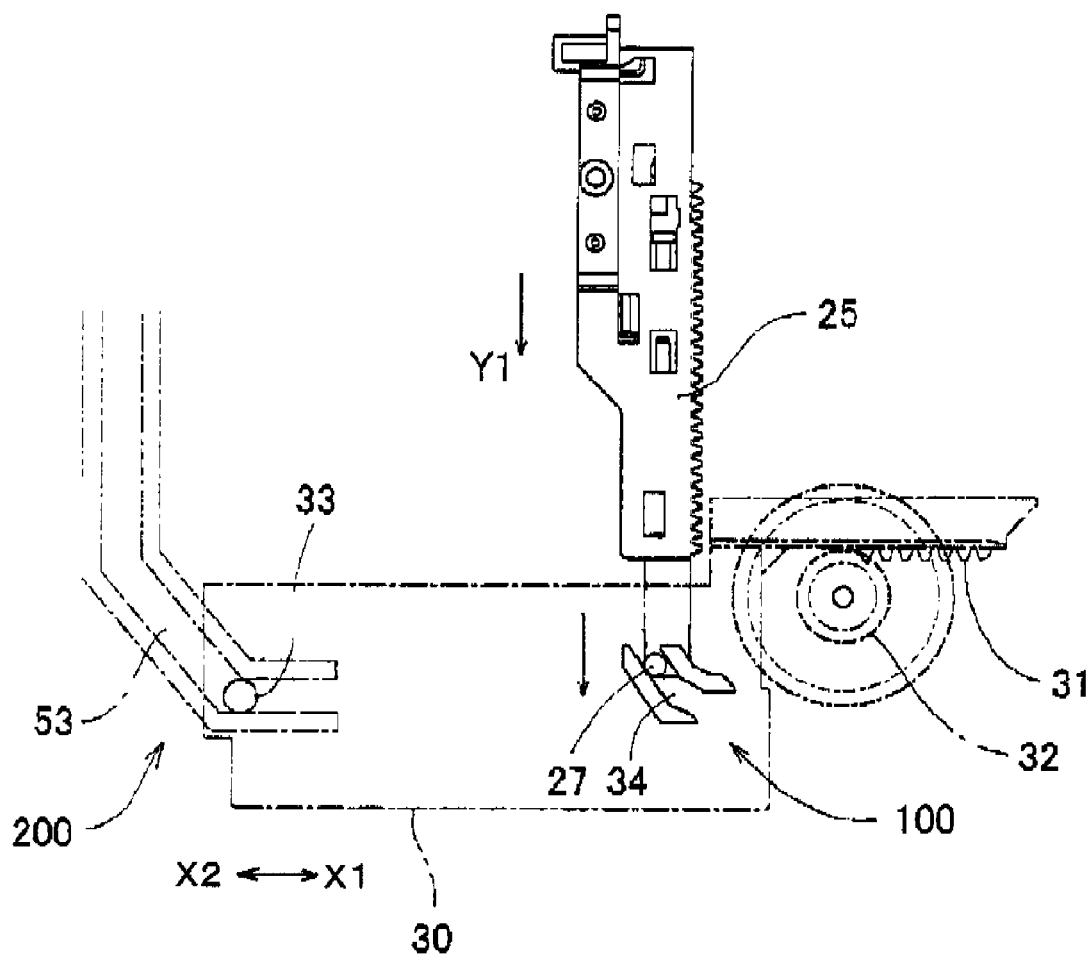
FIG. 5 is a diagram illustrating the positional relationship between the rack on the optical pickup side and the slider that has been initially moved from the forward limit position in the reverse direction.

As shown in FIGS. 4 and 5, the slider 30 has a slider cam groove 34 disposed on a back of the slider 30. A distal end of the optical pickup rack 25 has a protrusion 27 that mates with the slider cam groove 34 on an optical pickup side.

The slider rack 31 and the slider pinion 32 that mates with the slider rack 31 function as a feed mechanism. The feed mechanism reverses the slider 30 (arrow X2), which has initially moved in the reverse direction from the forward limit position shown in FIGS. 2 and 4, toward the reverse limit position. The feed mechanism also moves forward the slider 30 (arrow X1), which has initially moved in the forward direction from the reverse limit position in FIG. 3, toward the forward limit position. Also, a first cam mechanism 100 is formed by the slider cam groove 34 and the protrusion 27 shown in FIGS. 4 to 6. The first cam mechanism 100 serves to initially move the slider 30 in the reverse direction from the forward limit position in conjunction with the return of the optical pickup 21 (see FIG. 1) from the operating mode position toward the home position so that the slider 30 links to the slider pinion 32 that serves as the feed mechanism. Furthermore, a second cam mechanism 200 is formed by the sloped cam groove 53 and the protrusion 33 of the slider 30. The second cam mechanism 200 serves to link the disk tray rack 51 of the disk tray 50 to the tray gear 52. The disk tray rack 51 and the tray gear 52 form a disk tray ejecting mechanism.

The action and so forth of the disk device configured as above will now be described.

When the optical pickup 21 is located in the operating mode position, i.e., when a disk recording face is being scanned by the optical pickup 21, the optical pickup 21 moves in the operating mode position away from the home position (indicated by solid lines), as shown by the one-dot chain line in FIG. 2. When the optical pickup 21 is in the operating mode, the disk tray 50 is pulled into the chassis 10 and the protrusion 33 of the second cam mechanism 200 engages with the first guide groove 54 extending to the right and left of the disk tray 50 as shown in FIGS. 2 and 4. This engagement prevents unintended ejection of the disk tray 50. As shown in FIG. 4, the protrusion 27 of the first cam mechanism 100 is away from its mating component the slider cam groove 34. Furthermore, as shown in FIGS. 2 and 4, the slider 30 reaches the forward limit position and the slider rack 31 is across from the slider pinion 32 at a small distance δ. Accordingly, even though a single motor is used as the drive source for the optical pickup pinion 26 and the slider pinion 32, as long as the slider 30 does not move from the forward limit position in the reverse direction, the feed force produced by the rotation of the slider pinion 32 will not be transmitted to the slider 30. Therefore, there will be no unintended reverse movement of the slider 30 that would otherwise cause a malfunction or the like.

Figure 6:
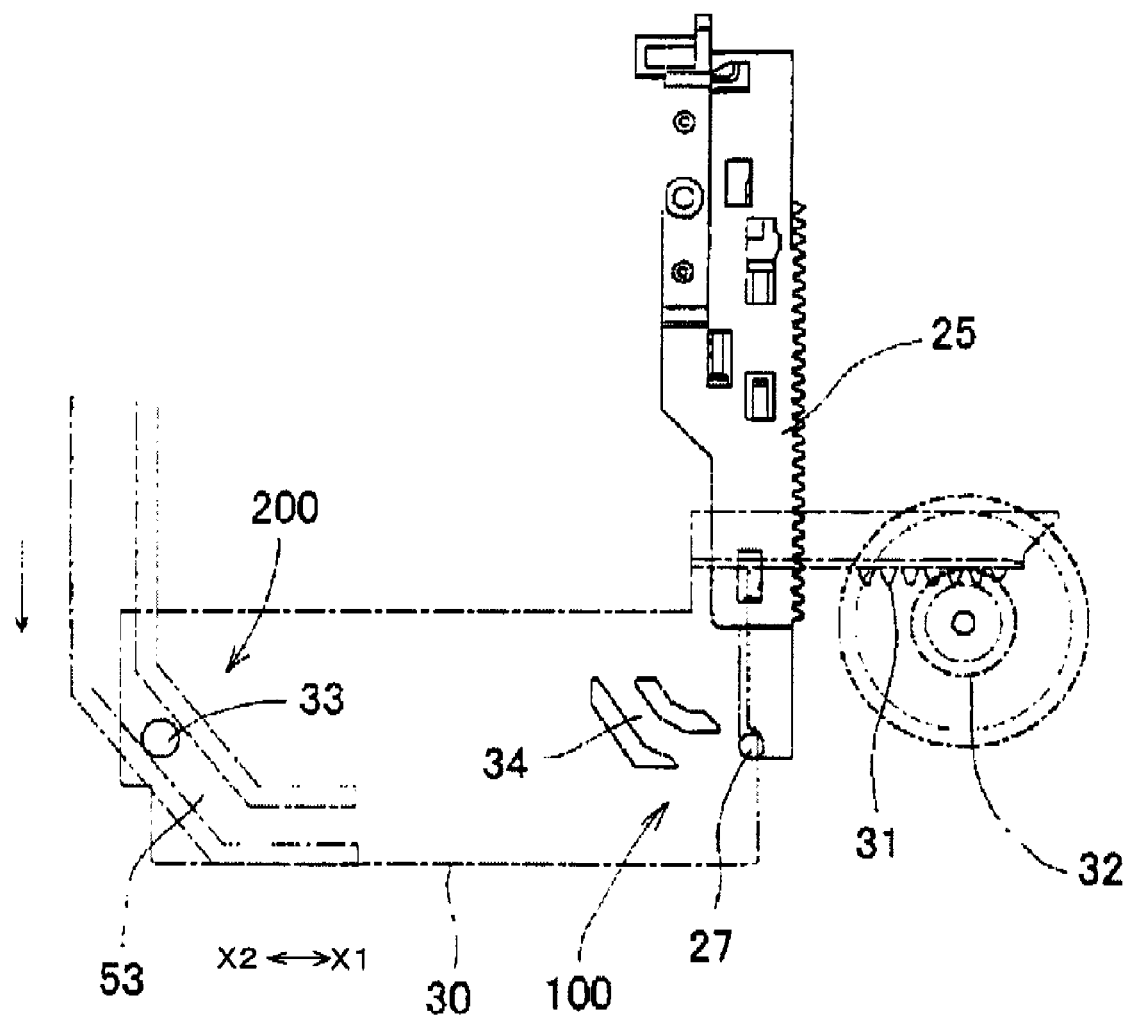
FIG. 6 is a diagram illustrating the positional relationship between the rack on the optical pickup side and the slider in the midst of the reverse movement.

When the optical pickup 21 is switched from the operating mode to the non-operating mode, the optical pickup 21 performs a return operation from the operating mode position and reaches the home position. During the return of the optical pickup 21 to the home position, as the optical pickup rack 25 approaches the slider 30, as indicated by the arrow Y1 in FIG. 5, the protrusion 27 of the optical pickup rack 25 engages with the slider cam groove 34 and pushes the slider 30 in the reverse direction. The result of this action of the first cam mechanism 100 is that when the slider 30 is initially moved from the forward limit position in the reverse direction (arrow X2), the slider rack 31 begins to mesh with the slider pinion 32. Then, the rotation of the slider pinion 32 is transmitted through the slider rack 31 to the slider 30 as shown in FIG. 6, and the slider 30 is fed toward the reverse limit position. At the beginning of the reverse movement of the slider 30, the protrusion 27 of the optical pickup rack 25 is pulled in the direction indicated by the arrow Y1 by the slider cam groove 34. This causes the optical pickup 21 to return to the home position, unmeshes the optical pickup rack 25 and the optical pickup pinion 26, and moves the optical pickup rack 25 away from the optical pickup pinion 26.

When the slider 30 thus reverses, the unloading of the disk begins. Specifically, the reversal of the slider 30 causes the boss 24 of the elevating frame 20 to be pushed down by the cam groove 35 of the slider 30 so that the elevating frame 20 is lowered. This lowering of the elevating frame 20 unclamps the disk, which up to this point had been clamped by the turntable 22 and the damper 40, and transfers the disk from the turntable 22 to the disk tray 50. The reversal of the slider 30 after the disk has been transferred to the disk tray 50 moves the protrusion 33 of the slider 30 from the first guide groove 54 of the disk tray 50 to the sloped cam groove 53 (see FIGS. 4 to 6). Then, the disk tray 50 is ejected slightly during the passage through the cam sloped groove 53. The disk tray rack 51 then meshes with the tray gear 52. At the same time, the protrusion 33 of the slider 30 reaches the first part of the second guide groove 55, the slider 30 reaches the reverse limit position shown in FIG. 3, and the slider rack 31 moves away from the slider pinion 32 until the slider rack 31 is across and at a distance away from the slider pinion 32. When the action of the second cam mechanism 200 results in the disk tray rack 51 being meshed with the tray gear 52 as discussed above, the rotation of the tray gear 52, causes the disk tray 50 to eject and protrude from the front of the chassis 10. Replacing the disk in the disk tray 50 and so forth are carried out when the disk tray 50 is protruding from the front of the chassis 10.

When a disk is loaded, the reverse rotation of the motor turns the tray gear 52. This rotation is transmitted to the disk tray rack 51 so that the disk tray 50 is pulled into the chassis 10. At the end of the pulling in of the disk tray 50, the protrusion 33 of the slider 30 engages with the sloped cam groove 53 so that the slider 30 begins its initial movement from the reverse limit position shown in FIG. 2 in the forward direction X1 and the slider rack 31 meshes with the slider pinion 32. As a result, the rotation of the slider pinion 32 feeds the slider 30 in the forward direction X1. At the end of the forward movement of the slider 30, the cam groove 35 of the slider 30 pushes the boss 24 up and raises the elevating frame 20. Therefore, the disk in the disk tray 50 is accepted by the turntable 22 and clamped between the turntable 22 and the damper 40. Also, the slider cam groove 34 engages with the protrusion 27 of the optical pickup rack 25 and moves the rack 25 along with the protrusion 27, thereby causing the rack 25 to mesh with the pinion 26. After this, the slider 30 reaches the forward limit position, the slider rack 31 moves away from the slider pinion 32 (see FIGS. 2 and 4), and the optical pickup 21 is switched to the operating mode.

With a disk device that operates as described above, when the slider 30 reaches the forward limit position, that is, when the optical pickup 21 is moving in the operating mode position, if the slider 30 should undergo initial movement in the reverse direction X2 and mesh with the slider pinion 32 due to vibration or the like, the slider 30 will be reversed by the feed force of the slider pinion 32, and may cause the risk of malfunction or other such trouble.

In view of this, in this embodiment, as shown in FIG. 1, a positioning mechanism or slider positioning mechanism 60 that includes a stopper 62 in the form of a tab is added to the chassis 10. The stopper 62 engages with a receiver 36 provided to the slider 30 in the forward limit position. The stopper 62 prevents unintended initial movement of the slider 30 in the reverse direction X2 (see FIG. 2).

Next, the positioning mechanism 60 and a positioning release mechanism 70 corresponding thereto will be described through reference to FIGS. 7 to 10.

Figure 7:
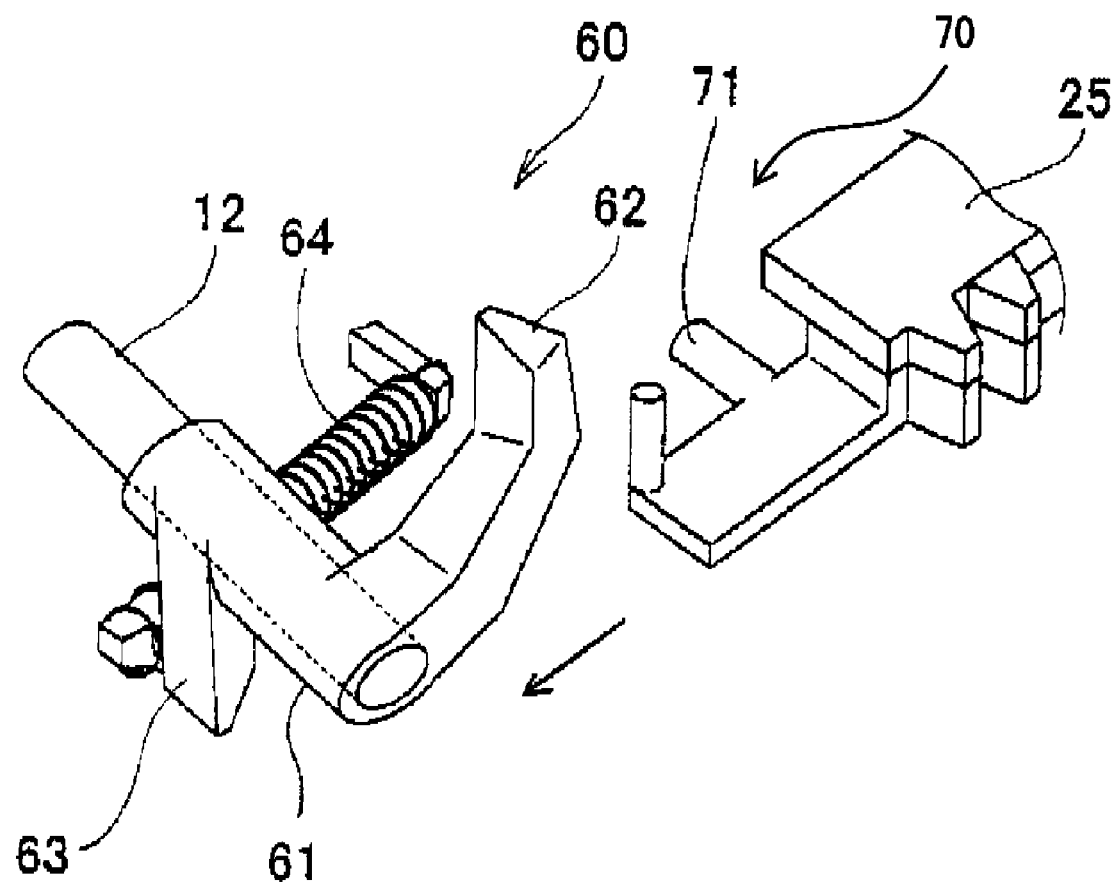
FIG. 7 is a simplified oblique view of a positioning mechanism and a positioning release mechanism.

As shown in FIG. 7, the positioning mechanism 60 further includes a cylindrical component 61. The cylindrical component 61 is rotatably attached to a horizontal support shaft 12 formed integrally with the chassis 10 (see FIGS. 1-3, for example). The stopper 62 is provided integrally with the cylindrical component 61. A lever-shaped receiving tab 63 is disposed on the cylindrical component 61. The stopper 62 is always elastically biased upward by a spring force of a spring 64 installed between the receiving tab 63 and a spring receiver (not shown) on a chassis side. The spring 64 includes an extension coil spring, for example. The chassis 10 is equipped with an engagement tab (not shown) that limits the upper limit position of the stopper 62 by engaging with the receiving tab 63.

Figure 8:
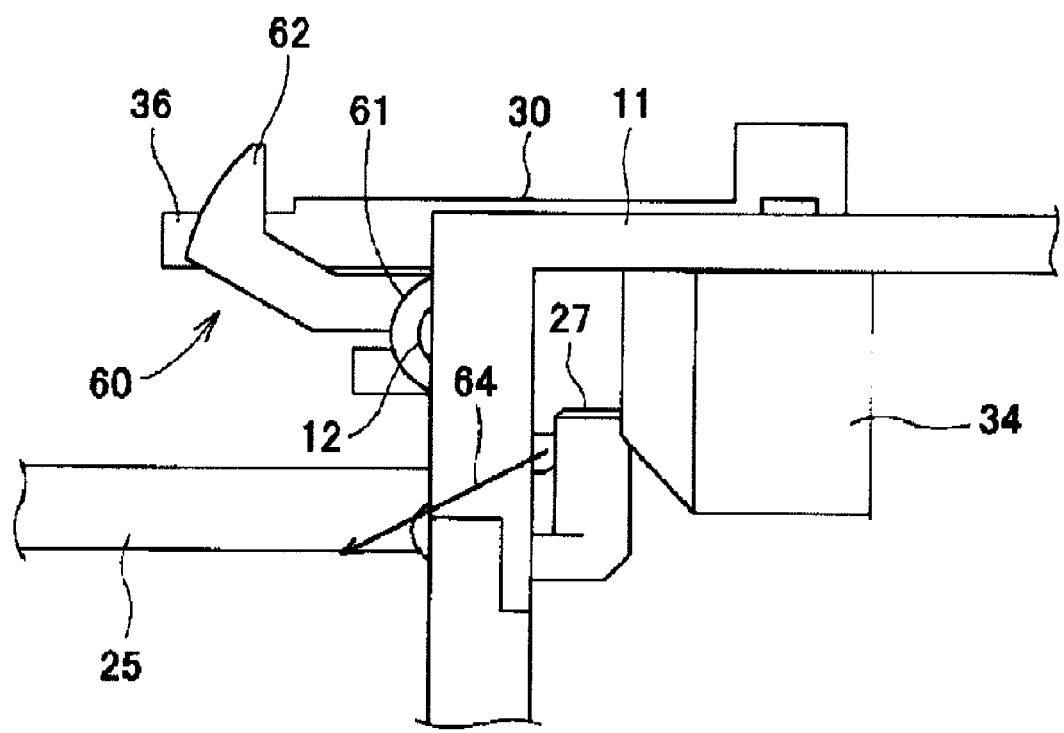
FIG. 8 is a diagram illustrating the operation of the positioning mechanism in an engaged position.
Figure 9:
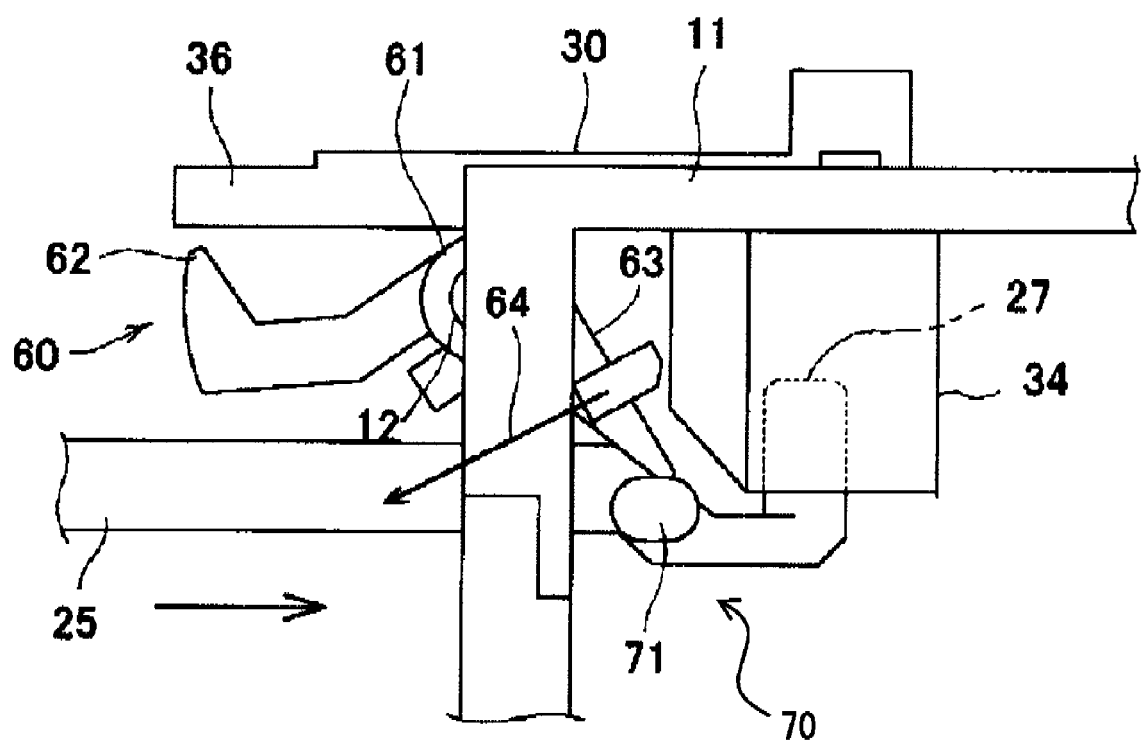
FIG. 9 is a diagram illustrating the operation of the positioning mechanism in a retracted position and the positioning release mechanism.
Figure 10:
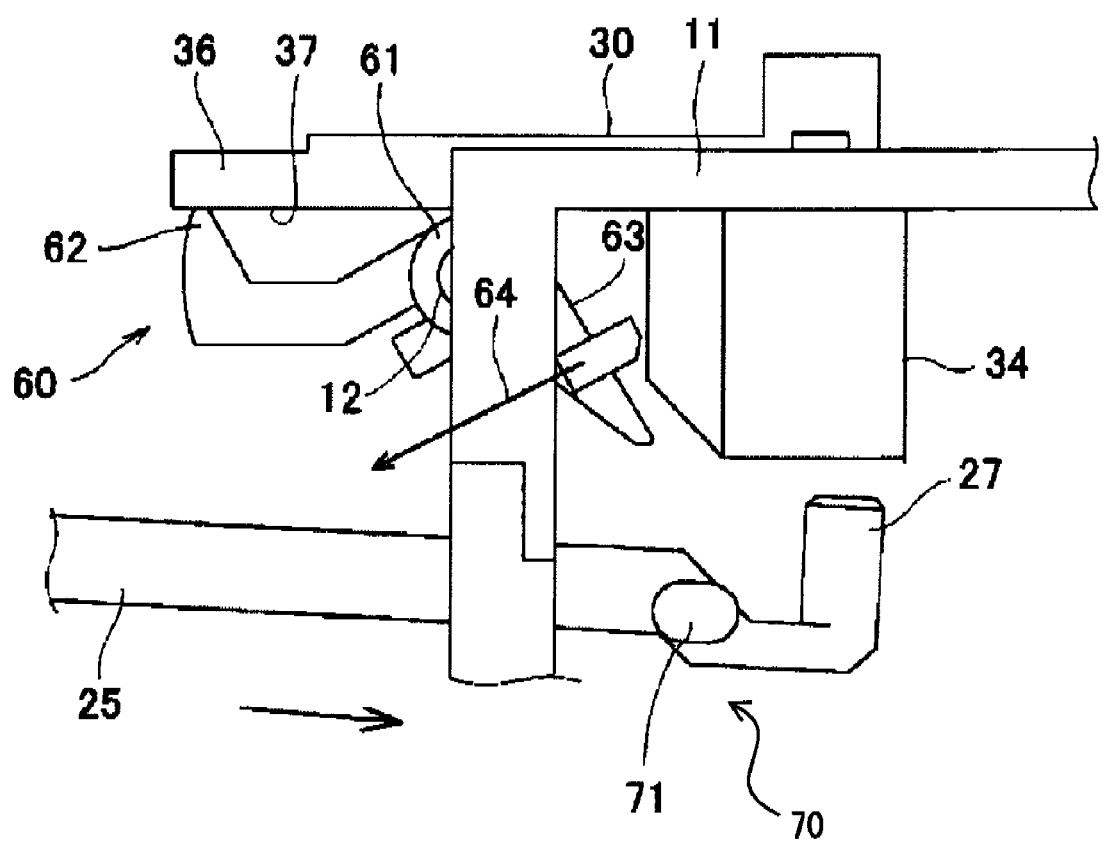
FIG. 10 is a diagram illustrating a state in which the stopper has hit the lower face of the slider.

As shown in FIGS. 8 to 10, the positioning mechanism 60 is configured such that the stopper 62 is capable of rotational displacement between an engaged position in which the stopper 62 is engaged with the receiver 36, and a retracted position, in which the stopper 62 is below the forward and reverse movement path of the slider 30. A rotational support point of the cylindrical component 61 is where the axial direction of the support shaft 12 coincides with the forward and reverse movement direction X of the slider 30 (see FIG. 2, for example).

The stopper 62, which is biased upward by the spring 64, hits a flat lower face 37 of the slider 30 and slides relative to the slider 30, as shown in FIG. 10 when the slider 30 is located at the reverse limit position, as shown in FIG. 3, through when the slider 30 has initially moved from the reverse limit position in the forward direction X1 up to the position, shown in FIG. 6, and further moved forward as shown in FIG. 5. When the slider 30 then reaches the forward limit position, the stopper 62 moves away from the lower face 37 of the slider 30, protrudes upward as shown in FIGS. 2 and 8 under the biasing of the spring 64, and engages with the receiver 36 of the slider 30. Therefore, the operation of the stopper 62 is controlled by the forward and reverse operation of the slider 30, so it is easy to manage the dimensions when the stopper 62 is added. Also, if the stopper 62 is engaged with the receiver 36 in the forward limit position of the slider 30, the slider 30 is effectively prevented from initial movement in the reverse direction X2. Therefore, this effectively prevents the slider 30 from undergoing initial movement in the reverse direction X2 and meshing with the slider pinion 32 due to vibration or the like. This further prevents the slider 30 from being reversed by the feed force of the slider pinion 32, which could cause malfunction or other such trouble.

Referring to FIG. 7, the positioning release mechanism 70 includes a pushing tab 71 that protrudes laterally and is disposed on the optical pickup rack 25 and the receiving tab 63. The function of the pushing tab 71 is to disengage the stopper 62 from the receiver 36 of the slider 30 by pushing the receiving tab 63. Specifically, when the stopper 62 is engaged with the receiver 36 in the forward limit position of the slider 30, the optical pickup 21 is switched from the operating mode to the non-operating mode, and the optical pickup 21 returns toward the home position. As shown in FIG. 9, at the end of this return movement, the pushing tab 71 pushes the receiving tab 63. This causes the stopper 62 to retract around the support shaft 12 and against the spring force of the spring 64 to the retracted position below the forward and reverse movement path of the slider 30. At the point when the optical pickup 21 has returned to the home position, as shown in FIG. 10, the pushing tab 71 slips under the receiving tab 63, and the biasing of the spring 64 causes the stopper 62 to hit the lower face 37 of the slider 30 that has initially moved from the forward limit position, so that the position of the stopper 62 is limited by the slider 30.

Next, the disk device has a disk transfer mechanism 80 that includes a turntable 22. The disk transfer mechanism 80 transfers a disk D to a disk tray 50 after the disk D has been unclamped by a clamping mechanism in conjunction with the feeding of the slider 30 to the reverse limit position by the slider pinion 32. The turntable 22 and the damper 40 constitute the clamping mechanism.

Figure 11A:
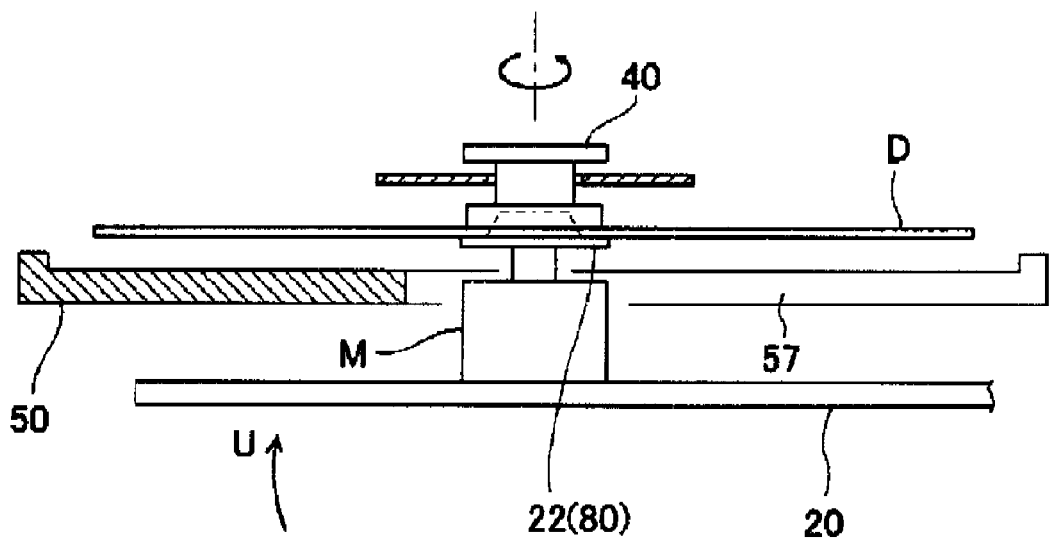
FIG. 11A is a diagram of a state in which a disk has been accepted by a disk transfer mechanism from a disk tray.
Figure 11B:
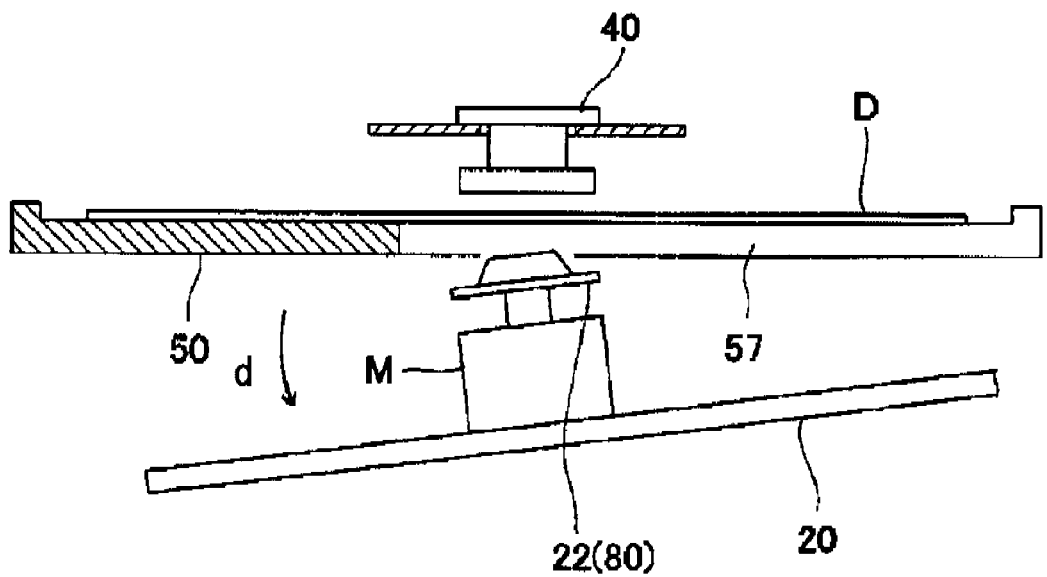
FIG. 11B is a diagram of a state in which the disk has been accepted by the disk tray.
Figure 12:
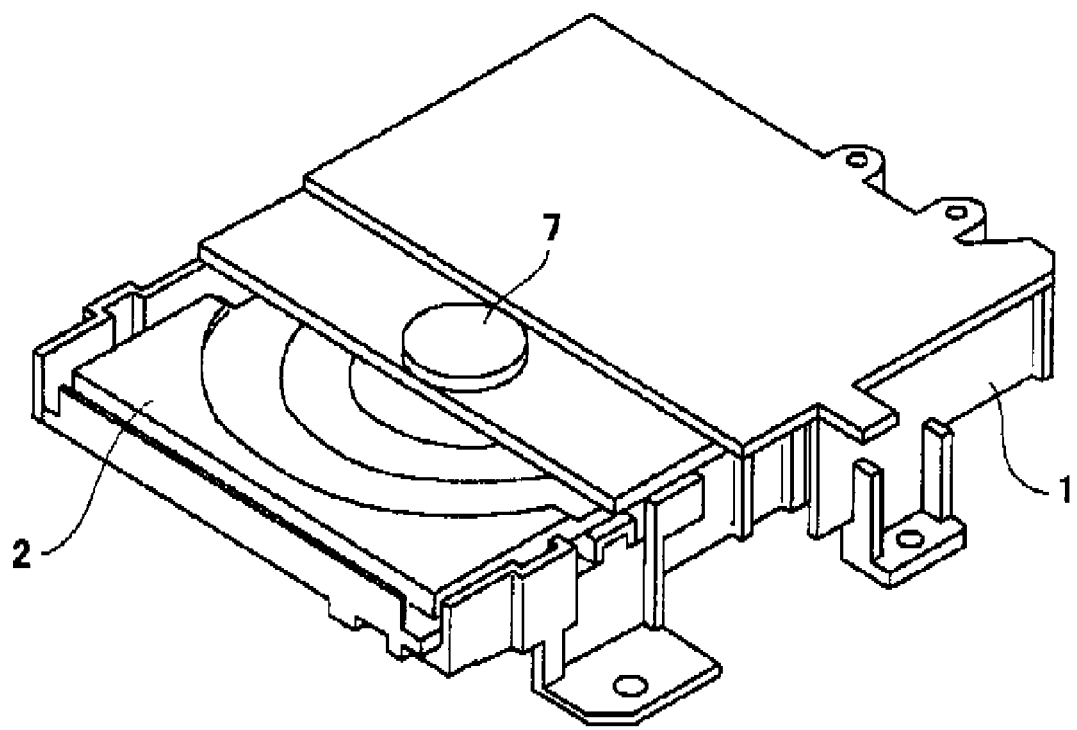
FIG. 12 is an external oblique view of a disk device.
Figure 13:
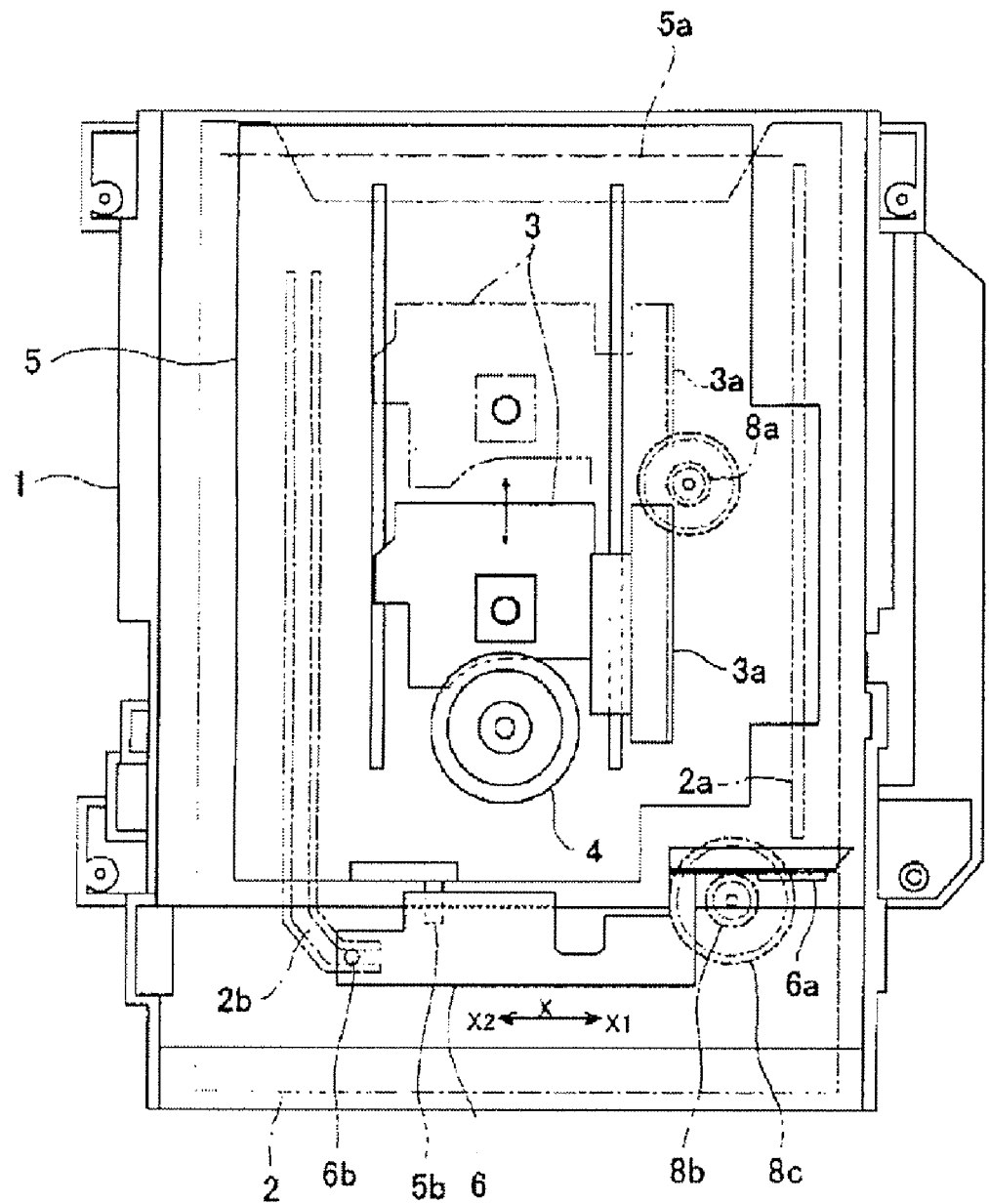
FIG. 13 is a plan view of the simplified configuration of the main components of a conventional disk device.

As shown in FIG. 11, the disk tray 50 forms an opening 57 through which the turntable 22 can pass up and down by raising and lowering the elevating frame 20. The turntable 22 is fastened to a rotary shaft of a drive motor M attached to the elevating frame 20. The elevating frame 20 goes down, as indicated by the arrow d in FIG. 11B from a state in which the disk D is clamped by the clamping mechanism formed by the turntable 22 and the damper 40. The disk D is transferred from the turntable 22 to the disk tray 50 as the turntable 22 moves from the upper to the lower side of the disk tray 50. the elevating frame 20 goes up as indicated by the arrow U in FIG. 11A from a state in which the elevating frame 20 has been lowered and the turntable 22 is located on the lower side of the disk tray 50. Then, the turntable 22 moves to the upper side of the disk tray 50, in the course of which the disk D, loaded in the disk tray 50 is accepted by the turntable 22 and clamped between the turntable 22 and the damper 40.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A disk device comprising:
a first cam mechanism configured and arranged to move a slider in a reverse direction from a forward limit position relative to a fixed chassis in conjunction with a return of an optical pickup from an operating mode position toward a home position, and further configured and arranged to link the slider to a feed mechanism for feeding the slider toward a reverse limit position;
a disk transfer mechanism configured and arranged to unclamp a disk clamped by a clamping mechanism in conjunction with the feeding of the slider to the reverse limit position by the feed mechanism, and further configured and arranged to transfer the disk to a disk tray;
a second cam mechanism configured to link the disk tray to a disk tray ejecting mechanism;
a slider positioning mechanism configured to prevent a movement of the slider in the reverse direction by engaging with the slider when the slider is at the forward limit position, the slider positioning mechanism including a stopper that is rotatable relative to the fixed chassis about a support shaft formed on the fixed chassis; and
a positioning release mechanism configured to operate the slider positioning mechanism so as to release the engagement of the slider positioning mechanism with the slider in conjunction with the optical pickup returning to the home position.

2. The disk device according to claim 1, wherein the stopper of the slider positioning mechanism includes a tab that prevents movement of the slider by engaging with the slider.

3. The disk device according to claim 2, wherein the stopper is arranged to rotate between an engaged position, in which the stopper engages with the slider, and a retracted position, in which the stopper is positioned below a movement path of the slider.

4. The disk device according to claim 3, wherein the stopper is always biased toward the engaged position.

5. A disk device comprising:
a first cam mechanism configured and arranged to move a slider in a reverse direction from a forward limit position in conjunction with a return of an optical pickup from an operating mode position toward a home position, and further configured and arranged to link the slider to a feed mechanism for feeding the slider toward a reverse limit position;
a disk transfer mechanism configured and arranged to unclamp a disk clamped by a clamping mechanism in conjunction with the feeding of the slider to the reverse limit position by the feed mechanism, and further configured and arranged to transfer the disk to a disk tray;
a second cam mechanism configured to link the disk tray to a disk tray ejecting mechanism;
a slider positioning mechanism configured to prevent a movement of the slider in the reverse direction by engaging with the slider when the slider is at the forward limit position, the slider positioning mechanism including a stopper in the form of a tab that prevents movement of the slider by engaging with the slider, the stopper being rotatably attached to a fixed chassis so as to rotate between an engaged position, in which the stopper engages the slider, and a retracted position, in which the stopper is disposed below a movement path of the slider, the stopper being always elastically biased toward the engaged position; and
a positioning release mechanism configured to operate the slider positioning mechanism so as to release an engagement of the slider positioning mechanism with the slider in conjunction with the optical pickup returning to the home position,
the positioning release mechanism including a pushing tab of the optical pickup and a receiving tab integrally provided to the stopper, and
the pushing tab pushing the receiving tab so as to release the stopper from the engaged position.

6. The disk device according to claim 5, wherein the feed mechanism includes a pinion that is rotationally driven by a drive motor for moving the optical pickup at the operating mode position, and a slider rack that is disposed on the slider and is located across and a distance away from the pinion when the slider is at the forward limit position, and the pinion is freewheeled by the drive motor during the movement of the optical pickup at the operating mode position.

7. The disk device according to claim 6, wherein the first cam mechanism includes a slider cam groove of the slider, and a protrusion of the optical pickup, the protrusion engaging with the slider cam groove in conjunction with the return of the optical pickup.

8. The disk device according to claim 7, wherein the stopper is attached to a cylindrical component rotatably attached to the fixed chassis, and the receiving tab is attached to the cylindrical component.

9. A disk device comprising:
a first cam mechanism configured and arranged to move a slider in a reverse direction from a forward limit position in conjunction with a return of an optical pickup from an operating mode position toward a home position, and further configured and arranged to link the slider to a feed mechanism for feeding the slider toward a reverse limit position;
a disk transfer mechanism configured and arranged to unclamp a disk clamped by a clamping mechanism in conjunction with the feeding of the slider to the reverse limit position by the feed mechanism, and further configured and arranged to transfer the disk to a disk tray;
a second cam mechanism configured to link the disk tray to a disk tray ejecting mechanism;
a slider positioning mechanism configured to prevent a movement of the slider in the reverse direction by engaging with the slider when the slider is at the forward limit position, the slider positioning mechanism including a stopper that prevents movement of the slider by engaging with the slider; and
a positioning release mechanism configured to operate the slider positioning mechanism so as to release an engagement of the slider positioning mechanism with the slider in conjunction with the optical pickup returning to the home position, the positioning release mechanism including a pushing tab of the optical pickup and a receiving tab integrally provided to the stopper, the pushing tab pushing the receiving tab so as to release the stopper from the engaged position.

10. The disk device according to claim 9, wherein the stopper of the slider positioning mechanism includes a tab that prevents movement of the slider by engaging with the slider.

11. The disk device according to claim 10, wherein the stopper is rotatably attached to a fixed chassis so as to rotate between an engaged position, in which the stopper engages the slider, and a retracted position, in which the stopper is positioned below a movement path of the slider.

12. The disk device according to claim 11, wherein the stopper is always biased toward the engaged position.

13. The disk device according to claim 12, wherein the feed mechanism includes a pinion that is rotationally driven by a drive motor for moving the optical pickup at the operating mode position, and a slider rack that is disposed on the slider and is located across and a distance away from the pinion when the slider is at the forward limit position, and the pinion is freewheeled by the drive motor during the movement of the optical pickup at the operating mode position.

14. The disk device according to claim 13, wherein the first cam mechanism includes a slider cam groove of the slider, and a protrusion of the optical pickup, the protrusion engaging with the slider cam groove in conjunction with the return of the optical pickup.

15. The disk device according to claim 14, wherein the stopper is attached to a cylindrical component rotatably attached to the fixed chassis, and the receiving tab is attached to the cylindrical component.

* * * * *